US005334436A

United States Patent [19]

Hobbs et al.

[11] Patent Number: 5,334,436

[45] Date of Patent: Aug. 2, 1994

[54] FLEXIBLE MATERIAL INCLUDING ACTIVE PARTICLES, PROCESS FOR THE PRODUCTION THEREOF, AND PROTECTIVE CLOTHING MADE THEREFROM

[75] Inventors: Karin Hobbs, Gefrees; Regina Hoffmann, Muenchberg; Klaus Smolik, Gefrees, all of Fed. Rep. of Germany

[73] Assignee: Helsa-Werke Helmut Sandler GmbH & Co. KG, Gefrees, Fed. Rep. of Germany

[21] Appl. No.: 18,764

[22] Filed: Feb. 17, 1993

[30] Foreign Application Priority Data

Feb. 29, 1992 [DE] Fed. Rep. of Germany ....... 4206443

[51] Int. Cl.[5] .......................... B32B 5/04; B32B 5/16; B32B 3/16; B32B 33/00

[52] U.S. Cl. .......................................... 428/195; 2/2; 156/84; 156/308.4; 156/324.4; 427/202; 427/207.1; 427/258; 427/389.9; 428/196; 428/197; 428/198; 428/201; 428/206

[58] Field of Search ............... 428/196, 197, 206, 195; 2/2; 427/202, 207.1, 258, 389.9, 412; 156/84

[56] References Cited

FOREIGN PATENT DOCUMENTS

0118618A1 9/1984 European Pat. Off. .
3304349C2 12/1991 Fed. Rep. of Germany .

*Primary Examiner*—James C. Cannon
*Attorney, Agent, or Firm*—Hoffmann & Baron

[57] ABSTRACT

To produce a flexible material comprising a carrier with active particles fixed thereon by adhesive points, the adhesive points are applied to the carrier when the carrier is of larger area than in its final condition, whereby the adhesive points with active particles adhering thereto are brought closer together in the final condition of the material than when the adhesive points were initially applied.

26 Claims, No Drawings

FLEXIBLE MATERIAL INCLUDING ACTIVE PARTICLES, PROCESS FOR THE PRODUCTION THEREOF, AND PROTECTIVE CLOTHING MADE THEREFROM

BACKGROUND OF THE INVENTION

Protective clothing such as protective suits for resisting gaseous and/or liquid noxious and/or odorous substances may be made from a range of different kinds of material. For example, EP-B-0 118 618 discloses flexible sheet materials which are suitable for making protective clothing, as well as a process for the production of such materials. The flexible sheet material to be found therein comprises an air-permeable carrier in web form, on which active particles which act on noxious and/or odorous substances and/or which react with same are fixed in a substantially uniform distribution by means of spaced-apart adhesive points or dots which in particular are applied to the carrier by a printing operation. Such a material can be produced by a procedure which involves applying spaced-apart adhesive points or dots by printing using a pattern or screen roller to a flexible air-permeable carrier web, with active particles being applied to the carrier web as long as the adhesive points or dots are still sticky, whereupon the particles are fixed to the carrier web with hardening of the adhesive. The carrier of the above-indicated material is a textile material while, as referred to above, the adhesive points or dots are applied to the carrier by printing using a roller in a rotary screen printing procedure.

It is however also possible for the carrier material used to be for example PU-foam, in which case then adhesive points or dots are normally not used for fixing the active particles on the carrier. Instead, the active particles are mixed with the adhesive to form a paste and the paste is then suitably applied to the foam carrier by a spreading process, for example using a brush.

The present invention is now more particularly concerned with an improvement in the sheet material having active particles in which the adhesive points are applied by being printed on the material carrier and then active particles are fixed to the adhesive points. With the adhesives which are generally used in that process however, a certain limit is set on the degree of fineness of the screen printing stencil used for producing the adhesive points on the carrier material, and that means that the spacing between the adhesive points is also subject to certain limitations. In general the usual adhesives can only be applied by printing using screen printing stencils down to a 30 mesh size, in order to prevent the adhesive dots from running together, which would thus result in the air-permeability of the carrier material being seriously reduced.

In that case, a plurality of active particles form a nested deposit on each adhesive point, and that results in regions in which there are no active particles occurring between adjacent adhesive points or nests of particles. In that situation, noxious and in particular toxic agents can flow through those regions without active particles, without being filtered and without being influenced, and that can have fatal consequences particularly if the material is to be used to afford protection from strong poisons.

That effect can have particularly dangerous consequences when the sheet material is used for protective clothing intended to provide protection from chemical warfare agents as, when the material is used for clothing, it is necessary to use suitably elastically stretchable carrier materials in order to guarantee the required mobility for the wearer of the protective suit. Particularly in the knee, elbow and buttocks regions, degrees of stretch of up to 50% may occur in such a situation, with the result that the spaces between the nests of particles are correspondingly considerably increased. That results in substantially greater permeability in regard to air and warfare agents and thus greatly reduces the protective effect of the suit, at least in some regions thereof.

SUMMARY OF THE INVENTION

An object of the present invention is to provide a flexible sheet material with active particles fixed thereon by adhesive points, which does not involve the formation of excessive spacings between the active particles, which spacings would permit the transmission through the material of noxious and/or odorous substances such as chemical warfare agents.

Another object of the present invention is to provide a flexible sheet material for protective clothing, which is capable of withstanding a considerable amount of stretch without substantially losing its protective effect.

Still another object of the present invention is to provide flexible sheet material which can be produced by applying adhesive points to a carrier material and applying active particles to the adhesive points in a simple procedure without involving major additional expenditure, while nonetheless ensuring that the material retains an effective protective effect even in a considerably stretched condition.

A still further object of the present invention is to provide a process for the production of a flexible material for protective clothing, which is simple to operate but nonetheless provides a material which retains an effective protective effect even when stretched.

Yet a further object of the present invention is protective clothing made from a flexible material having on a surface thereof active particles capable of acting on and/or reacting with noxious and/or odorous substances, for protective clothing.

In accordance with the present invention, in a first aspect, the foregoing and other objects are achieved by a flexible sheet material comprising an at least substantially air-permeable carrier in web form, on which active particles adapted to act on and/or react with noxious and/or odorous substances are fixed in at least substantially uniform distribution by means of spaced-apart adhesive points or dots which are produced for example by printing on the carrier. The carrier comprises a stretchable material or a material which is shrinkable by a physical and/or chemical treatment. Either the carrier material is stretched prior to application of the adhesive points and then, after the adhesive points have been applied thereto, for example by printing, the carrier material is relieved of the stretching stress, or the carrier material is shrunk by a suitable treatment after the adhesive points have been applied thereto.

In accordance with the present invention, in a further aspect, the foregoing and other objects are achieved by a process for the production of a flexible sheet material as set forth above, wherein spaced-apart adhesive points are printed as by a screen roller on a flexible air-permeable carrier material. Active particles are applied to the carrier material at the adhesive points thereon while the latter are still sticky. The carrier material being a mesh material which shrinks when subjected to the effect of heat, after the adhesive points and the active particles have been applied to the carrier material, the carrier material with adhesive points and particles is subjected to a heat treatment which results in shrinkage of the carrier material and at the same time hardening of the adhesive.

According to the invention, in still a further aspect, the foregoing and other objects are achieved by use of a material in accordance with the invention for the production of a protective suit for resisting at least one gaseous or liquid noxious and/or odorous substance.

It will be seen therefore that the material according to the invention and the process for the production thereof are such that the overall surface area of the carrier material at the moment at which the adhesive points or dots are applied thereto, for example by printing, is greater than in the finished sheet material. That provides that the nests of particles which are in fact produced when the carrier material is of its larger surface area dimensions, either by virtue of having been stretched prior to application of the adhesive points or by virtue of being in the still non-shrunk condition, are moved closer together in the finished product. By suitable choice in regard to the dimensions and the arrangement of the adhesive points and the carrier material, it is even possible to provide that the nest of particles practically adjoin each other without any major spacing therebetween. That ensures that noxious substances or the like cannot flow through between the nests of particles without coming into major contact with the active particles of the material. That substantially prevents substances such as toxic or chemical warefare agents from undesirably penetrating the material and in particular clothing made therefrom. Nonetheless the required air-permeability or breathability of the material is still maintained because in fact the carrier web material shrinks not only in the region between the adhesive points but also in the region of the adhesive points themselves, so that the total proportion of the surface area of the carrier, which is covered with adhesive points, is practically the same even after the reduction in the surface area of the material, that is to say in the final product, in comparison with the starting condition, that is to say when the carrier material is of larger surface area. In that respect, the reduction in the surface area of the carrier may additionally produce an advantageous effect such that the adhesive points with the active particles adhering thereto take on a cambered configuration, and thus are subject to what might be termed a three-dimensional deformation effect, whereby the residence time for the noxious substances in the region of the active particles is increased, thereby improving the effectiveness of the material.

As noted above, in principle, the desired effect of bringing the groups or nests of particles closer together in the finished material can be achieved by means of two procedures: either the carrier is stretched prior to the adhesive points or dots being applied thereto and is then allowed to return to its non-stretched condition in which it is then put to its subsequent use; or the carrier used is a shrinkable material which is subjected to the shrinkage treatment only after the adhesive points or dots have been applied to the carrier.

A wide range of different materials can be used for the carrier in web form. In a preferred feature of the invention however the carrier is a textile web which in particular makes it possible to achieve good air-permeability or breathability.

The textile material used may be any one of a wide range of materials comprising widely different substances, being both synthetic and natural materials, for example polyester, polyamide, polyacryl, cotton, viscose or mixtures thereof, or the like. It is particularly desirable for the carrier in web form to be formed by a synthetic, preferably textured mesh or stitch material.

Particularly when the carrier is to be used for clothing purposes, in accordance with a preferred feature of the invention the carrier comprises a stretchable material. It will be appreciated that it is also possible to use a stretchable material when the carrier material is in principle shrinkable in order to ensure a suitable yielding effect on the part of the material, when it is used for clothing. Materials of all possible textile weave configurations may be used as the stretchable material, for example double-rib or Raschel material, layered material, woven material or non-woven or fleece material. In a preferred feature of the invention however the stretchable material is a knitted or woven material.

In a preferred feature the diameter of the adhesive points or dots is to be at least about 0.3 mm in order to ensure that the active particles are reliably fixed in position.

Sufficiently good adhesion of the active particles can be attained if the adhesive points or dots are formed for example by a fusion adhesive, a dispersion adhesive, a low-solvent reaction adhesive or a mixture of at least two such adhesives. It will be noted that in a preferred feature of the invention the adhesive may be a cold-cross-linking acrylic resin adhesive, more preferably such an adhesive comprising an acrylic resin dispersion and a cross-linking agent based on sodium carbonate and/or sodium bicarbonate. The use of a cold-cross-linking acrylic resin adhesive gives the advantage that it can be used to fix even temperature-sensitive active particles to the carrier material. When using an adhesive comprising an acrylic resin dispersion and a cross-linking agent based on sodium carbonate and/or sodium bicarbonate, it is possible to improve the adhesion of slightly alkaline particles to the carrier material.

Another preferred feature of the invention provides that the active particles include adsorber particles, more especially ball or spherical adsorbers, or particles which chemically react with at least one noxious substance or act as a catalyst for such a chemical reaction. The adsorber particles may be for example activated carbon or synthetic adsorbers.

In order to ensure particularly good reaction conditions as between the active particles and the noxious and/or odorous substances but at the same time also to provide that a sufficiently large number of particles can be applied to the carrier material in a suitable advantageous configuration, a preferred feature of the invention may provide that the active particles are of a size of between 0.05 and 2 mm, more especially less than 0.25 mm, while in a particularly preferred feature of the invention the active particles are preferably at least approximately spherical and are of a diameter of between about 0.1 and 0.25 mm.

It will be readily appreciated that a large number of different operating procedures can be employed for producing the material in accordance with the present invention, for example the carrier can be stretched prior to application of the adhesive points by purely mechanical means and for example chemical procedures can also be used in regard to shrinking the carrier. However, mechanical stretching of the carrier prior to the application of the adhesive points will generally involve a comparatively high level of expenditure on machinery while the use of chemical procedures for shrinking the carrier may have adverse effects on the active particles.

The problems just indicated can be at least substantially eliminated by the process in accordance with the principles of the present invention, wherein the carrier material which is shrinkable when subjected to the effect of heat is subjected to a heat treatment, after the adhesive points and the active particles have been applied thereto, whereby the carrier shrinks and the adhesive hardens at the same time.

That process can in principle be carried out with any known machinery as in fact such machinery already hitherto included a drying chamber for hardening the adhesive of the adhesive points holding the active particles to the material. The modified procedure in accordance with the present invention merely needs to afford the possibility of the material being satisfactorily guided when it issues from the drying chamber, in spite of the carrier web shrinkage, and possibly being wound up to form a roll. That however can be achieved without involving substantial additional expenditure on equipment.

Desirably, in the above indicated process according to the invention, the carrier web used is a textured interlock meshwear or stitch material of polyester, which is subjected to a heat treatment at between about 150° and 170° C. for a period of between about 3 and 5 minutes, which makes it possible to achieve a degree of shrinkage of the carrier material of up to 50%.

Further objects, features and advantages of the invention will be apparent from the following description of an Example of manufacture of a material according to the invention.

EXAMPLE

This Example uses a carrier in web form comprising interlock material Tlg. 40 of 100%, polyester, textured, dtex 30, with a gross weight of about 55 $g/m^2$. That carrier is web material which is produced from tube material by a suitable preliminary treatment, of a ladder-resistant nature, of a width of about 135 cm.

Adhesive is applied to that material by means of a 30 mesh pattern or stencil roller, using a roller with a stencil size of between 0.2 and 0.3 mm. The roller used is preferably a roller which has hexagonal holes therein. The transverse dimension or generally diameter of the holes in the stencil member is about 560 $\mu m$. That machine configuration produces a punctiform application of adhesive on the carrier material, with points or dots of a diameter of about 0.7 mm, with about 60% of the surface area of the web of carrier material being covered with adhesive.

The adhesive used is an adhesive comprising an acrylic resin dispersion and a cross-linking agent based on sodium carbonate and sodium bicarbonate. That is an adhesive which already undergoes cross-linking at low temperatures in the alkaline range so that it can be used to provide for very good fixing of slightly alkaline particles.

The adhesive can be for example of the following composition:

between 980 and 990 parts by weight of acrylic resin dispersion as offered for example by Chemische Fabrik Tubingen under the designations Tubvinyl 647 D or Trial H1101/4 between 5 and 10 parts by weight of sodium carbonate between 5 and 10 parts by weight of sodium bicarbonate thickening agent additive (the amount required to produce the viscosity necessary for the printing operation).

When using adhesives of that kind, the cross-linking reaction takes place in a manner which is known per se from epoxy resins, by polyaddition, in which respect no troublesome by-products, for example formaldehyde, are produced.

After the adhesive points or dots have been applied to the carrier web by the printing procedure, an excess of active particles, more especially spherical natural or synthetic activated carbon particles with an average diameter of 0.23 mm, are strewn over the carrier material. The particles adhere to the adhesive points which have not yet hardened due to the cross-linking effect, after which about 1000 adsorber particles/$cm^2$ remain on the carrier web after removal of the excess of adsorber particles.

The carrier web with adhesive points and adsorber particles disposed thereon by the above-described procedure is then subjected to a heat treatment for 3 minutes at 170° C. in a drying passage. In that operation the material forming the carrier web shrinks due to thermal shrinkage effects in such a way that its surface area after the heat treatment is about 35% smaller than its original area. That means at the same time that the covering of adsorber particles per unit of surface area rises by about 50% or, starting from the above-specified original adsorber particle density of about 1000 adsorber particles/$cm^2$, there is an increase therein to about 1500 adsorber particles/$cm^2$.

While the material is passing through the drying passage, cross-linking of the adhesive points takes place at the same time so that, when it leaves the drying passage, both the sheet material has been suitably shrunk and also the adsorber particles have been sufficiently firmly fixed to the carrier web.

The sheet filter material web which now leaves the drying passage can then also be provided with a covering, for example comprising a thermoplastic fleece material, on the side which bears the active particles, in order to prevent the active particles from being excessively rubber off when the material is worn, for example in the form of a suit. For the purpose of applying the thermoplastic fleece, for example of polyester, the sheet material together with the thermoplastic material is passed between two heated rollers, which gives the further advantage that the particles are additionally pressed against the adhesive points and the carrier material so that the adhesion of the particles is still further improved.

The material when produced in that way is then subjected to further processing and used for clothing in the usual manner, for example as the inner layer of protective suits.

It will be appreciated that the above-described Example of the material and the process for the production of the material in accordance with the invention has been set forth solely by way of example and illustration of the invention and that various other modifications and alterations may be made therein without thereby departing from the spirit and scope of the invention.

We claim:

1. A flexible sheet material comprising an at least substantially air-permeable carrier in web form, spaced-apart adhesive points on the carrier, and active particles adapted to interact with at least one of noxious and odorous substances and fixed on said carrier by means of said adhesive points in an at least substantially uniform distribution on the carrier, said carrier in web form having a surface area reduced from the carrier surface area at the time said spaced-apart adhesive points were applied thereto.

2. A material as set forth in claim 1, wherein said carrier comprises a stretchable material and was stretched prior to application of the adhesive points thereto and was then relieved of its stretching stress after said application of said adhesive points.

3. A material as set forth in claim 1, wherein said carrier comprises a material which was shrinkable by at least one of physical and chemical treatments and was shrunk by suitable treatment after application of said adhesive points thereto.

4. A material as set forth in claim 1 wherein said carrier is of textile material.

5. A material as set forth in claim 1 wherein said carrier is formed by a synthetic mesh material.

6. A material as set forth in claim 5 wherein said material is textured.

7. A material as set forth in claim 1 wherein said carrier comprises a knitted material.

8. A material as set forth in claim 1 wherein said carrier comprises a woven material.

9. A material as set forth in claim 1 wherein said adhesive points are of a diameter of at least about 0.3 mm.

10. A material as set forth in claim 1, wherein said adhesive points are formed by a substance selected from the group consisting of a fusion adhesive, a dispersion adhesive, a low-solvent reaction adhesive and a mixture of at least two such adhesives.

11. A material as set forth in claim 10 wherein said adhesive is a cold-cross-linking acrylic resin adhesive.

12. A material as set forth in claim 11 wherein said adhesive comprises an acrylic resin dispersion and a cross-linking agent based on at least one substance from the group consisting of sodium carbonate and sodium bicarbonate.

13. A material as set forth in claim 1 wherein said active particles include adsorber particles.

14. A material as set forth in claim 13 wherein said adsorber particles are adsorber balls.

15. A material as set forth in claim 1 wherein said active particles are particles adapted to chemically react with at least one said noxious and odorous substance.

16. A material as set forth in claim 1 wherein said active particles are particles adapted to act as catalyst means for a chemical reaction with at least one said noxious and odorous substance.

17. A material as set forth in claim 1 wherein said active particles are of a size of between about 0.05 and 2 mm.

18. A material as set forth in claim 17 wherein said active particles are of a size of less than about 0.25 mm.

19. A material as set forth in claim 18 wherein said active particles are approximately spherical and are of a diameter of between about 0.1 and 0.25 mm.

20. A process for the production of a flexible sheet material comprising an at least substantially air-permeable carrier, spaced-apart adhesive points applied to the carrier, and active particles adapted to interact with at least one of noxious and odorous substances and fixed on said carrier by said adhesive points in a substantially uniform distribution on the carrier, wherein said spaced-apart adhesive points are applied to said carrier which is of a material which shrinks when subjected to the effect of heat, and active particles are applied to said carrier at said adhesive points while said adhesive points are still sticky, whereupon the carrier with said adhesive points and said active particles thereon is subjected to a heat treatment which results in shrinkage of said carrier and at the same time hardening of said adhesive to fix said active particles on said carrier.

21. A process as set forth in claim 20 wherein said adhesive points are applied to said carrier by a printing operation using a roller.

22. A process as set forth in claim 20 wherein said carrier is a textured interlock meshwear material of polyester and the heat treatment is effected at between about 150° and 170° C. for a period of between about 3 and 5 minutes.

23. In a process for the production of a flexible sheet material comprising an at least substantially air-permeable carrier to which active particles adapted to interact with at least one of noxious and odorous substances are fixed in a substantially uniform distribution by means of spaced-apart adhesive points on said carrier, the process including the steps of applying adhesive to the surface of said carrier in the form of adhesive points which are disposed at spacings from each other, then applying active particles to said surface of said carrier whereby active particles adhere to said adhesive points, and then causing hardening of said adhesive of said adhesive points to fix said active particles thereon, the improvement that the surface area of the carrier is reduced after the application thereto of said adhesive points and said active particles whereby said adhesive points with the active particles adhering thereto are moved closer together.

24. A process as set forth in claim 23 wherein said carrier comprises a stretchable material, the process including the step of stretching said stretchable material prior to application of the adhesive points and then relieving the stretching stress applied to the material after application of the adhesive points and said active particles, thereby to reduce the surface area of said carrier.

25. A process as set forth in claim 23 wherein said carrier is a material which is shrinkable by a treatment, the process including the step of shrinking said carrier material after application of said adhesive points and said active particles, thereby reducing the surface area of said carrier.

26. Protective clothing for resisting at least one of gaseous and liquid noxious and odorous substances, produced from a material as set forth in claim 1.

* * * * *